UNITED STATES PATENT OFFICE.

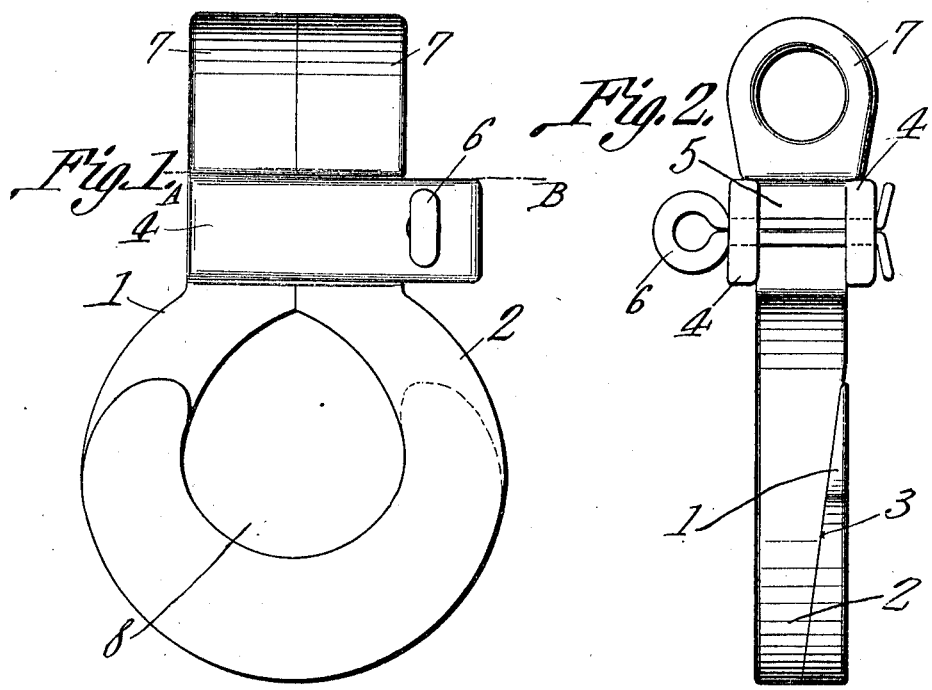
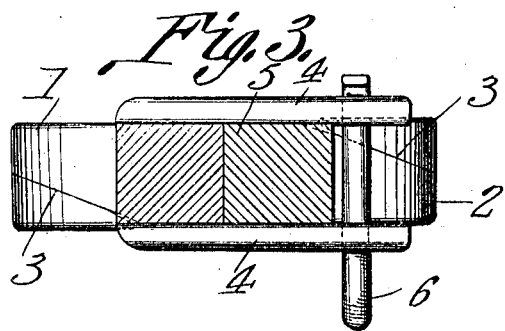

LINWOOD E. FOSTER, OF HOQUIAM, WASHINGTON.

SISTER-HOOK.

970,033.

Specification of Letters Patent.

Patented Sept. 13, 1910.

Application filed June 1, 1910. Serial No. 564,407.

*To all whom it may concern:*

Be it known that I, LINWOOD E. FOSTER, a citizen of the United States, residing at Hoquiam, in the county of Chehalis and State of Washington, have invented a new and useful Sister-Hook, of which the following is a specification.

It is the object of this invention to provide a sister hook, the component elements of which may be united in a novel and improved manner.

Another object of the invention is to provide a sister hook, one of the component elements of which is provided with outstanding arms, adapted to receive the other constituent element of the hook, the construction being such that the last named element will be held between the arms, both against rotation, and against movement transversely of the said arms; another object of the invention is to provide a novel means whereby the element which is engaged between the arms of its fellow, may be retained therein.

In the drawings,—Figure 1 is a side elevation; Fig. 2 is an edge elevation; and Fig. 3 is a transverse section on the line A—B of Fig. 1.

In carrying out the invention, two hooks are provided, the same being denoted by the numerals 1 and 2, respectively. The hook 1 is provided, intermediate its ends, with parallel, transversely disposed, outstanding arms 4. The hooks 1 and 2 are adapted to coöperate to form an eye 8, and the portions of the hooks which thus coöperate are beveled, as denoted by the numeral 3, to form a compact structure. That portion of the hook 2 which is adapted to be mounted between the arms is rendered polygonal, as denoted by the numeral 5, so as to fit between the said arms more closely and against rotation.

The arms 4 are prolonged beyond the polygonal portion 5 of the hook 2, and are provided, in their prolongations, with openings, through which a securing element, such as a cotter pin 6 or the like may be thrust. The upper ends of the hooks 1 and 2 are provided with coöperating eyes 7, adapted to receive a line.

It is to be noted that the eye 7 of the hook 2 outstands beyond the adjacent faces of the arms 4. Thus, when the said hook 2 is mounted between the arms 4, the eye 7 of the hook 2 constitutes a means for limiting the movement of the hook 2 transversely of the arms 4. By reason of the fact that the hook 2 is provided with a polygonal portion 5, the said hook will be prevented from rotating between the arms 4, and thus, the mating portions of the hooks 1 and 2 which coöperate to form the eye 8, will be held closely together. When a rope is passed through the eyes 7, it will be seen that the two hooks 1 and 2 are held together, so that the hook 2 cannot slip out from between the arms 4; and in this connection, it may be stated, that, although the employment of the cotter pin 6 is desirable, it is by no means necessary, since the rope which is passed through the eyes 7, will serve to hold the two hooks together.

The device is capable of many applications which will readily suggest themselves to the lumbermen and rigger.

The device is simple in construction, and it will be seen that although the constituent elements thereof may readily be separated, they are so constructed nevertheless, that they may be readily united, and when united, will retain their positions, until manipulated with a deliberate attempt to separate them.

Having thus described the invention, what is claimed is:—

1. A device of the class described comprising two disconnected, freely separable hooks, adapted to be united to form an eye, one of the hooks having spaced, outstanding arms, between which the other hook may be slid, that portion of the hook which is disposed between the arms being polygonal to register closely between the arms; the hooks having coöperating elements to receive a line.

2. A device of the class described comprising two disconnected, freely separable hooks, adapted to be united to form an eye, one of the hooks having spaced, outstanding arms, between which the other hook may be slid; the hooks having coöperating line-receiving eyes, the eye of the last named hook being adapted to engage the arms to limit the movement of said hook transversely of the arms.

3. A device of the class described comprising two disconnected, freely separable hooks, adapted to be united to form an eye, one of the hooks having spaced outstanding arms between which the other hook may be slid, the arms being prolonged beyond the last named hook, and having openings in their prolongations, adapted to receive a securing element; the hooks having coöperating elements to receive a line.

In testimony that I claim the foregoing as my own, I have hereto affixed my signature in the presence of two witnesses.

LINWOOD E. FOSTER.

Witnesses:
 ED. B. ARTHAND,
 J. B. LUCAS.